United States Patent
Liu et al.

(10) Patent No.: US 10,653,127 B2
(45) Date of Patent: *May 19, 2020

(54) INSECT SENSING SYSTEMS AND METHODS

(71) Applicant: Verily Life Sciences LLC, South San Francisco, CA (US)

(72) Inventors: Jianyi Liu, Santa Clara, CA (US); Peter Massaro, San Carlos, CA (US)

(73) Assignee: VERILY LIFE SCIENCES LLC, South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/514,871

(22) Filed: Jul. 17, 2019

(65) Prior Publication Data

US 2020/0093113 A1 Mar. 26, 2020

Related U.S. Application Data

(63) Continuation of application No. 15/787,182, filed on Oct. 18, 2017, now Pat. No. 10,375,947.

(51) Int. Cl.
*A01M 1/02* (2006.01)
*G06K 9/46* (2006.01)
(Continued)

(52) U.S. Cl.
CPC .......... *A01M 1/026* (2013.01); *G01S 7/4811* (2013.01); *G06K 9/209* (2013.01); *G06K 9/2036* (2013.01);
(Continued)

(58) Field of Classification Search
CPC ................ A01M 1/026; A01M 31/002; A01M 2200/012; G01S 7/4811; G01S 17/02;
(Continued)

(56) References Cited

U.S. PATENT DOCUMENTS 5,646,404 A 7/1997 Litzkow et al.
6,493,363 B1 12/2002 Shuman et al.
(Continued)

OTHER PUBLICATIONS

Shuman, Monitoring System Counts Insects, Identifies Species, Agricultural Research, Retrieved from the internet: https://agresearchmag.ars.usda.gov/ar/archive/2003/jul/insect0703.pdf, Jul. 2003, 2 pages.
(Continued)

*Primary Examiner* — Jamil Ahmed
(74) *Attorney, Agent, or Firm* — Kilpatrick Townsend & Stockton LLP

(57) ABSTRACT

One example insect sensing system includes a light emitter configured to emit light; a structured light generator positioned to receive the emitted light and configured to generate structured light from the emitted light; a plurality of light sensors arranged in a line, each of the light sensors oriented to receive at least a portion of the structured light and output a sensor signal indicating an amount of light received by the respective light sensor; a processing device configured to: obtain the sensor signals from each of the light sensors, and determine a presence of an insect based a received sensor signal from at least one light sensor, the sensor signal indicating a reduced amount of received light by the at least one light sensor. Another example insect sensing system includes a camera comprising an image sensor and a lens having an aperture of f/2.8 or wider; and a processor configured to obtain an image from the camera and detect an insect in the image.

18 Claims, 13 Drawing Sheets

(51) Int. Cl.
  *G01S 7/481* (2006.01)
  *G06K 9/20* (2006.01)
  *A01M 31/00* (2006.01)
  *G05D 7/06* (2006.01)

(52) U.S. Cl.
  CPC ............ *G06K 9/46* (2013.01); *A01M 31/002* (2013.01); *A01M 2200/012* (2013.01); *G05D 7/06* (2013.01)

(58) Field of Classification Search
  CPC .... G01S 17/026; G06K 9/2036; G06K 9/209; G06K 9/46; G06T 5/20; G05D 7/06
  See application file for complete search history.

(56) References Cited

U.S. PATENT DOCUMENTS

| | | |
|---|---|---|
| 7,071,829 B2 | 7/2006 | Gardner, Jr. et al. |
| 7,496,228 B2 | 2/2009 | Landwehr et al. |
| 2005/0025357 A1 | 2/2005 | Landwehr et al. |
| 2016/0245916 A1* | 8/2016 | Weber-Grabau ......... G01V 8/20 |
| 2017/0249512 A1 | 8/2017 | Mcclatchie et al. |
| 2018/0018774 A1 | 1/2018 | Kacher et al. |

OTHER PUBLICATIONS

International Application No. PCT/US2018/056010 , "International Search Report and Written Opinion", dated Nov. 7, 2018, 16 pages.

* cited by examiner

INSECT SENSING SYSTEMS AND METHODS

CROSS-REFERENCE TO RELATED APPLICATIONS

This application is a continuation of co-pending U.S. patent application Ser. No. 15/787,182, filed Oct. 18, 2017, titled "Insect Sensing Systems and Methods," the entirety of which is hereby incorporated herein by reference.

FIELD

The present application generally relates to insect release mechanisms, and more specifically relates to insect sensing systems and methods.

BACKGROUND

All continents except Antarctica suffer from the plague of mosquito-vectored diseases. Various techniques for the control of mosquito populations involve the generation of sterile male insects for release into the wild for mating with local females. These techniques require systems for releasing the reared insects into the wild.

SUMMARY

Various examples are described for insect sensing systems and methods. One example sensing system includes a light emitter configured to emit light; a structured light generator positioned to receive the emitted light and configured to generate structured light having a shape; a plurality of light sensors arranged according to the shape, each of the light sensors oriented to receive at least a portion of the structured light and output a sensor signal indicating an amount of light received by the respective light sensor; a processing device configured to: obtain the sensor signals from each of the light sensors, and determine a presence of an insect based a received sensor signal from at least one light sensor, the sensor signal indicating a reduced amount of received light by the at least one light sensor.

One example method includes emitting light using a light emitter; generating structured light having a shape; receiving at least some of the structured light using a plurality of light sensors arranged according to the shape, each of the light sensors oriented to receive structured light and output a signal indicating an amount of light received by the respective light sensor; obtaining the signals from each of the light sensors; determining a presence of an insect based on a reduced amount of received light based on a received signal from at least one light sensor and an average amount of received light from one or more of the light sensors, the reduced amount of received light below a reference threshold.

Another example sensing system includes a camera comprising an image sensor and a lens having an aperture of f/2.8 or wider, the camera positioned to capture an image including an interior portion of an insect release tube, the camera oriented at an oblique angle to a longitudinal axis of the insect release tube, and a depth of focus of the camera is located within an interior volume of the insect release tube; and a processor in communication with a non-transitory computer-readable medium and configured to execute processor-executable code stored in the non-transitory computer-readable medium to: obtain an image from the camera; and detect an insect in the image.

Another example method includes obtaining an image from a camera comprising an image sensor and a lens having an aperture of f/2.8 or wider; and detecting an insect in the image using an edge detection technique; wherein: the camera is positioned to capture images of an interior volume of an insect release tube, the camera is oriented such that a focal axis of the camera is oriented at an oblique angle to a longitudinal axis of the release tube, and a depth of focus of the camera is located within the interior volume of the insect release tube These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Examples are described herein in the context of insect sensing systems and methods. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

To help eliminate insect-borne diseases, sterile male insects, such as mosquitoes, may be released into an environment, where they mate with female insects, but will not generate any offspring. Thus, the insect population is reduced over time. To help effectively control an insect population in such a way, it can be important to know the number of insects being released into a particular area. However, thousands of insects may be released in a relatively short time, e.g., a few minutes, while a release vehicle travels through an area, and so it can be difficult to accurately detect the actual number of insects being released at any particular time at any particular location.

Figure 1:
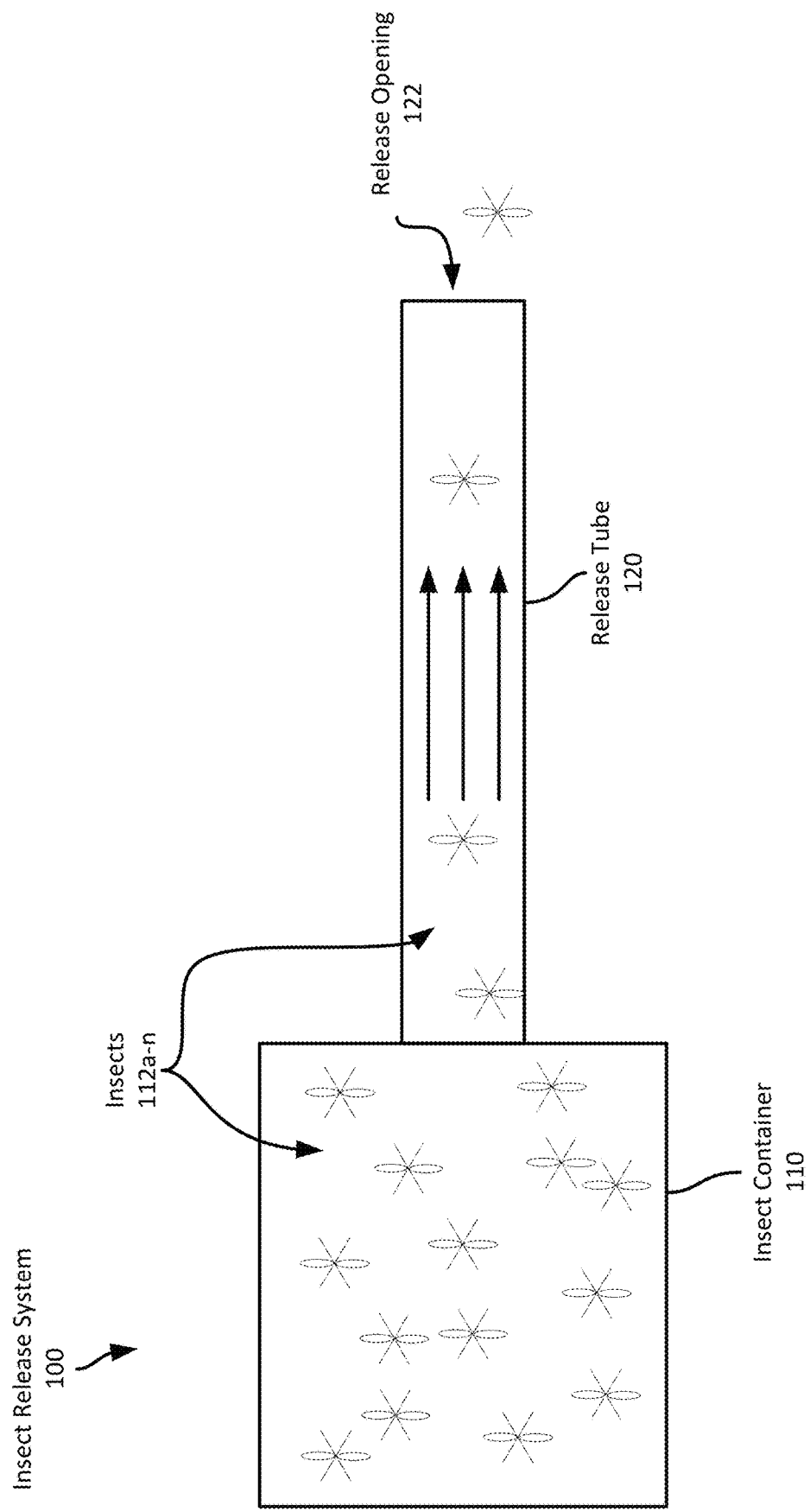
FIG. 1 shows an example system for releasing insects from a container.

FIG. 1 shows an example insect release system 100, which includes an insect container 110 having a population of insects 112*a-n*. The insect container 110 is connected to the proximate end of a release tube 120, through which insects may travel and escape from the insect container and into the environment via the release opening 122 at the distal end of the release tube. Such a release system 100 may also include a fan or blower to encourage the insects to exit the container 110 and the release tube 120, or to increase the flight speed of the insects.

Figure 2:
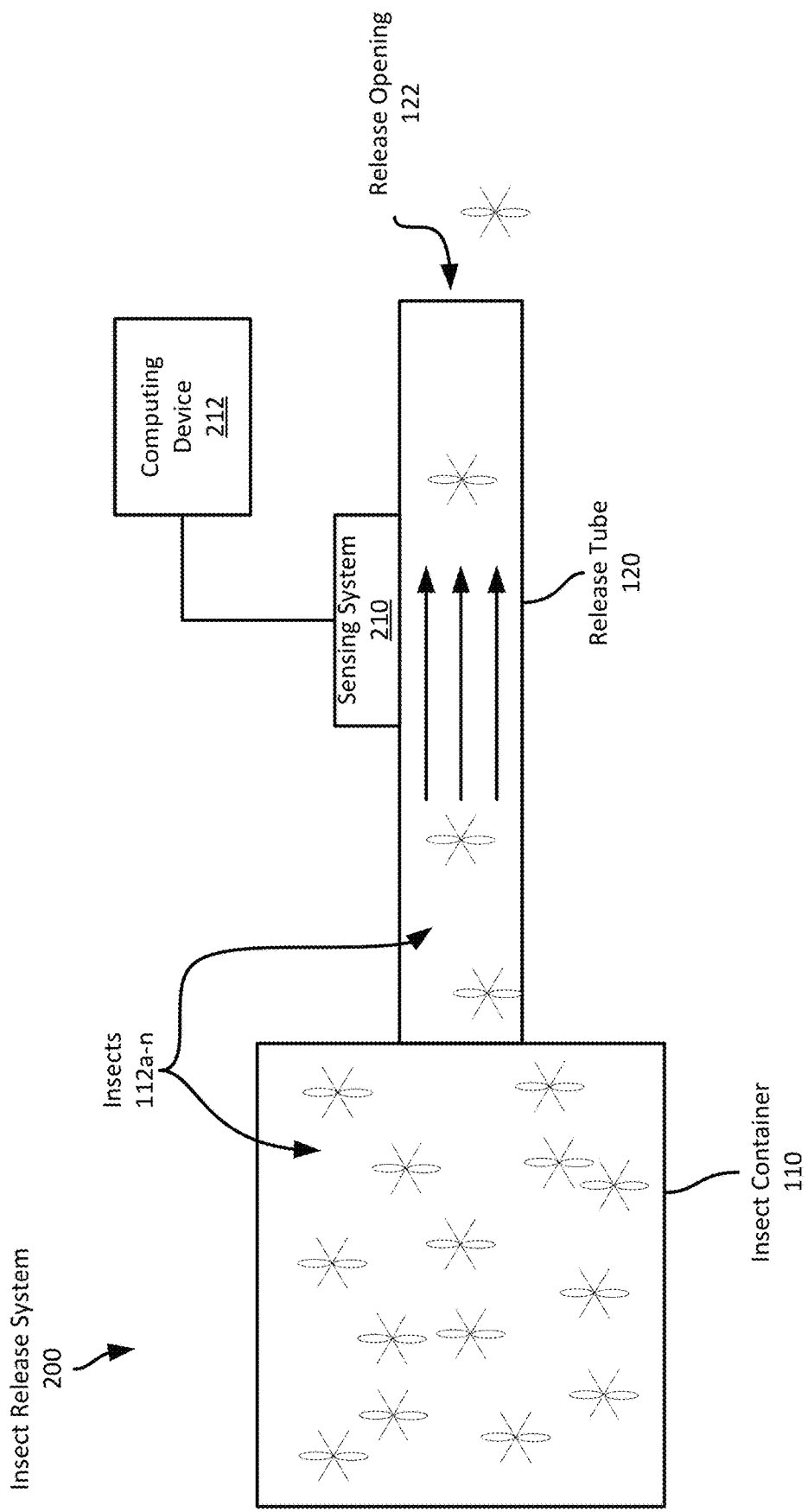
FIGS. 2-8 show example insect sensing systems.

Referring now to FIG. 2, to count the insects as they are released, a sensing system 210 according to this disclosure may be used to count insects as they travel through the release tube 120. The sensing system 210 sends signals to the computing device 212, which may then count insects based on the received signals. Some examples of suitable insect sensing systems are described in detail below with respect to FIGS. 3-9. Further, while the insect sensing system 210 is located at a particular position on the release tube 120, it should be appreciated that an insect sensing system 210 according to this disclosure may be positioned at any suitable location along the length of the release tube 120.

Figure 3:
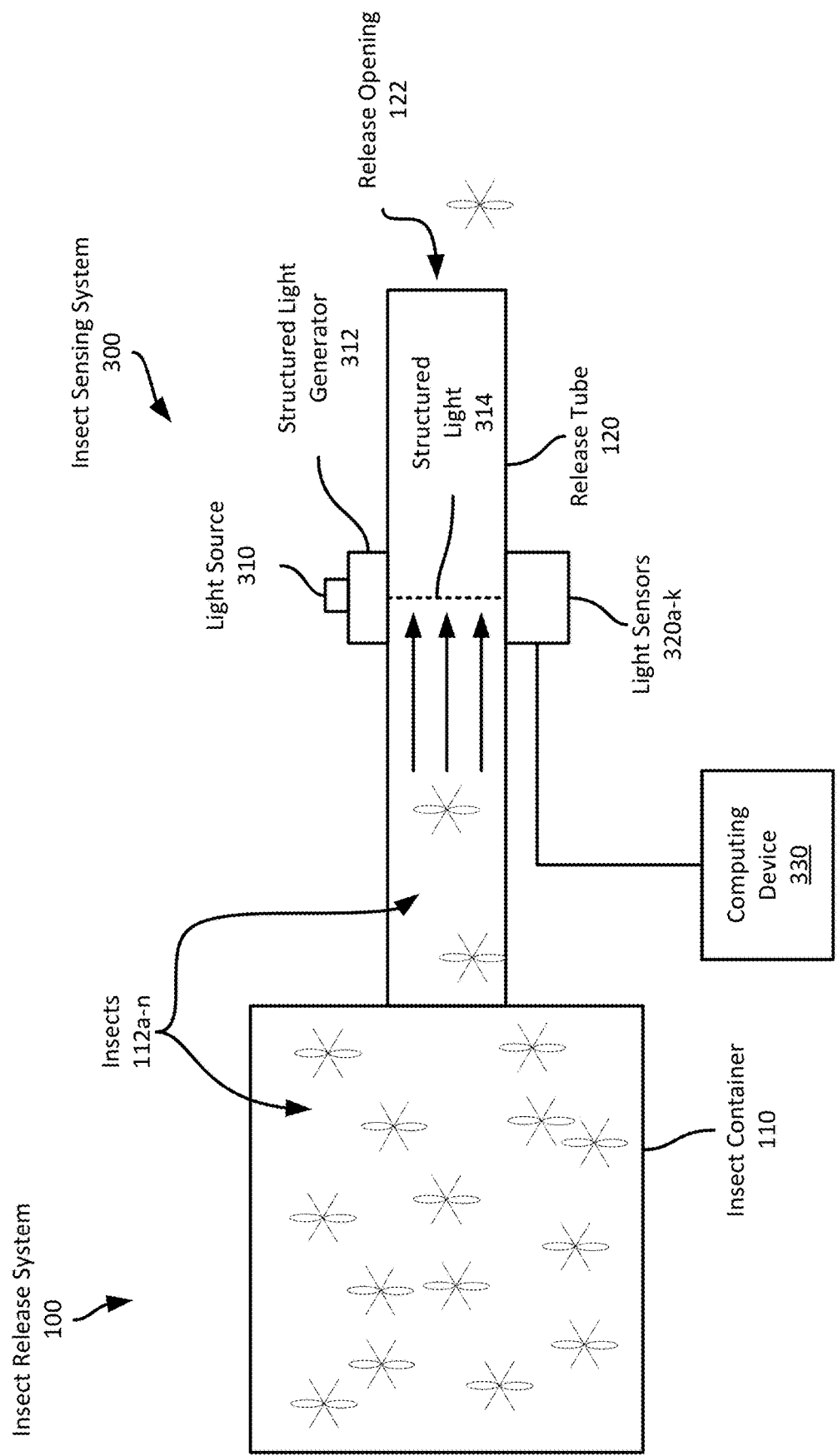

FIG. 3 illustrates an insect release system 100 that includes an example insect sensing system 300 that includes a light source 310, a structured light generator 312, a number of light sensors 320*a-k* ("k" represents any integer greater than 1), and a computing device 330 that controls the light source 310 and receives sensor signals from the light sensors. In this example, the light source 310 emits light, which strikes the structured light generator 312. The structured light generator 312 receives the incoming emitted light and generates structured light 314 that is projected across the interior volume of the release tube 120 towards the light sensors 320*a-k*. The light sensors 320*a-k* are oriented to align with the structured light 314 and output signals to the computing device 330 based on the amount of light received at each respective light sensor.

Structured light according to this disclosure refers to light rays that are oriented to generate a specific shape. For example, output from a light source may be structured to generate a line, a circle, a rectangle, etc. Any suitable structured light generator may be employed, and may include the use of one or more lenses, including laser line generator lenses, convex or concave lenses; one or more mirrors; one or more diffraction elements, such as prisms; one or more diffuser elements; etc. In one example, a structured light generator may include a plate or other flat piece of material having a hole formed at a location corresponding to a light source, such as an LED, to allow only a small portion of the light from the light source to pass through the hole. In some examples, multiple light sources and corresponding holes may be employed. Further, by adjusting the position of the holes with respect to the light sources, an angle of light passing through the hole may be accurately adjusted and controlled. In some examples, generating structured light may also involve techniques such as collimation to generate parallel rays of light. Collimation may be performed using a collimation structure, such as a Fresnel lens, a convex lens, a fiber optic coupler, etc. It should be appreciated, however, the structuring light may or may not involve collimation.

In this example, the light source 310 is a laser-light source, but may be any suitable light source. In some examples, it may be advantageous to employ substantially monochromatic light, and so one or more light filters may be employed to reduce the number of wavelengths of light provided to the structured light generator 312, or projected from the structured light generator 312 across the interior volume of the release tube 120. Employing substantially monochromatic light may allow the computing device 330 to more easily filter ambient light signals from the sensor signals received from the light sensors 320*a-k*.

In this example, each light sensor 320*a-k* is a discrete phototransistor that is separated by approximately 1 mm from each adjacent phototransistor; however, any suitable spacing may be employed. Spacing may be selected based on the size of the insects to be detected in a particular example. For example, to detect mosquitoes, light sensors may be separated by approximately 1 mm or less to provide sufficient resolution such that a mosquito is unlikely to pass through the structured light 314 at a location with no corresponding light sensor. In some examples, however, light sensors 320*a-k* may be spaced at intervals greater than 1 mm. For example, larger insects, such as flies, may allow for greater spacing between light sensors, e.g., 3 mm or more. Spacing of light sensors may therefore be based on the average or expected size of insects that will traverse the release tube. And while in this example, the light sensors 320*a-k* are discrete electronic components, such as a phototransistor, a photodiode, or a photoresistor, in some examples, suitable light sensors may be embedded on a monolithic component, e.g., an image sensor such as charge-coupled device ("CCD"), CMOS image sensor, etc. In this example, the light sensors 320*a-k* output a current in proportion to an amount of light received; however, in some examples, the light sensors 320*a-k* may output a signal indicating a voltage, resistance, etc. indicating an instantaneous amount of light received by the light sensor. In some examples, however, light sensors may output an average amount of light received over a period of time, or may output a digital value indicating an amount of light received.

The structured light 314 in this example is projected across the interior volume of the release tube 120 at an angle perpendicular to the length of the release tube 120, and across the entire cross-section of the release tube. However, other examples may be projected at an oblique angle with respect to the length of the release tube 120. The positioning of the light sensors 320*a-k* with respect to the light source 310 is based on the angle of the structured light projected by the structured light generator 312. Thus, the light sensors 320*a-k* are placed to receive the structured light 314. However, because ambient light may also be detected by the light sensors, the light sensors 320*a-k* may be placed distant from the release opening 122. In this example, the release tube 120 is approximately three feet long, and the light sensors 320*a-k* are positioned approximately 18 inches from the release opening 122. It should be appreciated that these dimensions are only examples, and any suitable length of release tube 120 may be employed, and the light sensors 320*a-k* may be placed at any position along the length of the release tube 120 according to different design goals or requirements.

The computing device 330 is any suitable computing device, such as the computing device 1300 described with respect to FIG. 13 below. It is in communication with both the light sensors 320*a-k* and the light source 310 (communication link not shown), and is configured to transmit a signal to activate or deactivate the light source 310. In some examples, however, the computing device 330 is not in communication with the light source 310, which instead may be directly connected to a power source. In addition, the computing device 330 is configured to receive sensor signals from the light sensors 320*a-k* and detect insects based on the received sensor signals. In this example, each individual light sensor transmits its own sensor signals; however, in some examples, the sensor signal may include information from multiple light sensors, e.g., in the case of an image sensor.

In operation, insects 112a-n (where "n" represents any integer greater than 1) are allowed to travel from the insect container 110 through the release tube 120, through the structured light 314, and out the release opening 122. In this example, the computing device 330 receives sensor signals from the light sensors 320a-k and determines an approximate average sensor value for each light sensor 320a-k to determine a baseline value for each detector when no insect is present. The computing device 330 samples the received sensor signals at a rate of approximately 10,000 samples per second and compares each sample against the determined average sensor value. When a sensor signal deviates from the average sensor value for a respective light sensor by a threshold amount, the computing device 330 registers an insect and increments an insect counter and ignores subsequent sensor signals from that particular light sensor, until the sensor signal returns to the average sensor value (or within a threshold amount of the average sensor value). The computing device 330 then determines that the insect has entirely passed through the structured light 314 and begins looking for the next insect. It should be appreciated that a single insect may interfere with light received by multiple light sensors. Therefore, in some examples, the computing device 330 may determine that multiple adjacent light sensors all indicate a reduction in detected light and determine each of the detectors is detecting the same insect. However, if the spacing of the light sensors 320a-k is sufficiently high, the computing device 330 may treat every individual reduction in detected light at a different sensor as a distinct insect.

While in the example described above, the computing device 330 compares each sample against a determined average sensor value, in some examples, such a comparison may be performed in circuitry outside of the computing device 330. For example, comparators may be employed to compare received sensor values against threshold values, such as average sensor values. The output of the comparators may then be provided to the computing device 330, either directly or via one or more intermediate components, such as amplifiers, inverters, etc.

Figure 4:
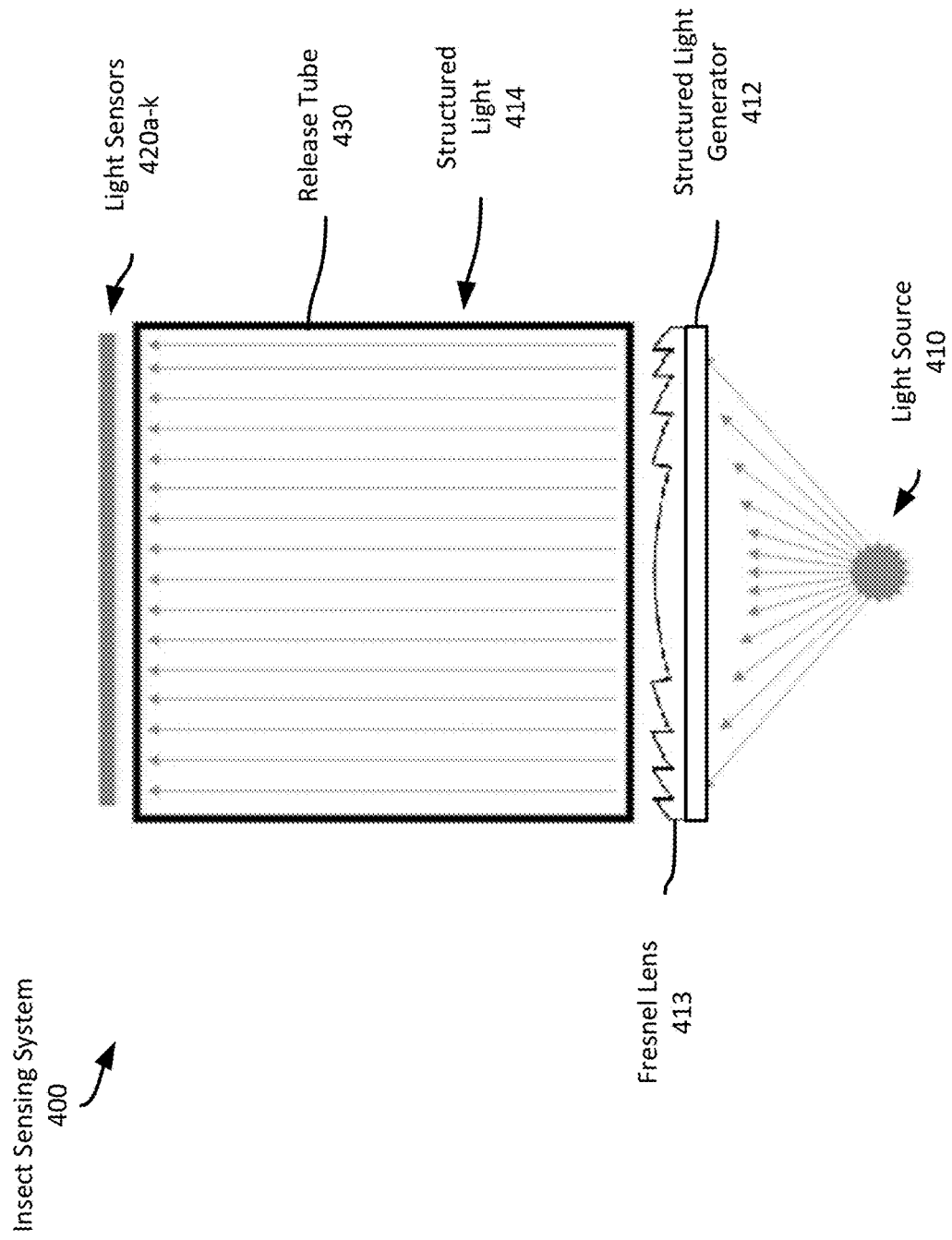

Referring now to FIG. 4, FIG. 4 shows an example insect sensing system 400. The insect sensing system 400 includes a light source 410, a structured light generator 412, a Fresnel lens 413, and multiple light sensors 420a-k. In this example, the light source 410 is a solid state laser. As can be seen in the figure, light emitted from the light source 410 is received by the structured light generator 412, which generates structured light that is then passed through the Fresnel lens 413 to collimate the structured light 414 that is ultimately projected across the interior volume of the release tube 430. The structured light 414 traverses the interior volume of the release tube 430 and arrives at the light sensors 420a-k, which provide sensor signals to a computing device (not shown). While the example insect sensing system 400 shown in FIG. 4 operates by emitting structured light in one direction, other examples may employ structured light emitted in multiple directions. Further, while this example employs a Fresnel lens 413, in some examples, other types of lenses may be employed. In some examples, no additional lens may be used and the structured light generator 412 directly emits the structured light 414.

Figure 5:
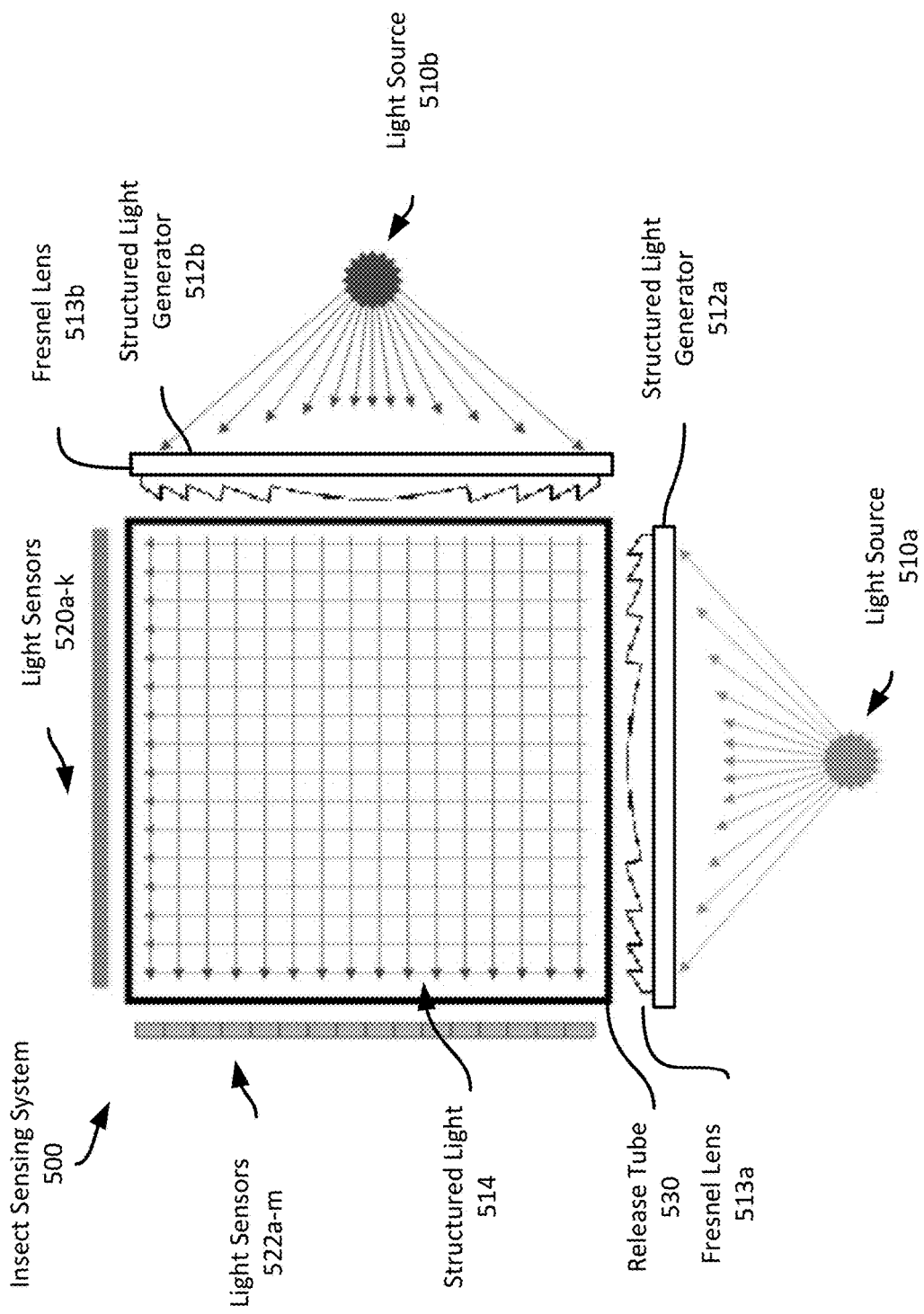

The example insect sensing system 500 shown in FIG. 5 employs two light emitters 510a-b, each emitting onto a respective structured light generator 512a-b and through a respective Fresnel lens 513a-b. The structured light generators 512a-b and Fresnel lenses 513a-b are oriented such that the structured light emitted by one structured light generator/Fresnel lens combination is emitted in a direction orthogonal to structured light emitted by the other structured light generator/Fresnel lens combination. Light sensors 520a-k, 522a-m ("m" refers to any integer greater than 1) are positioned on the opposite side of the release tube 730 from a respective structured light generator 512a-b. Such an arrangement may enable higher resolution sensing of insects passing through the release tube 530, or may provide more robust detection of multiple insects that pass through the insect sensing system 500 substantially simultaneously. Further, as discussed above with respect to FIG. 4, while this example employs Fresnel lenses 513a-b in addition to the structured light generators 512a-b, in some examples, other types of lenses may be employed. In some examples, no additional lens may be used and the structured light generators 512a-b directly emit the structured light 514.

While this example shows two light sources 510a-b oriented to projected structured light 514 orthogonal to each other, other numbers of light source/structured light generator/detector arrangements may be employed in some examples. For example, three light source/structured light generator/detector arrangements may be positioned to detect insects within a release tube such that each arrangement is positioned 120 degrees offset from each other. However, in such an example, light from one source may strike a light sensor associated with a different light source. Thus, it may be desirable to provide spacing between sets of light sensors, or to employ different colors or wavelengths of light emitters to mitigate such effects.

Further, while the example insect sensing system 500 shown in FIG. 5 projects structured light 514 from two different sources 510a-b in the same plane, in some examples, the light source/structured light generator/detector arrangements may be offset from one another such that an insect may first traverse structured light from one such arrangement and, after travelling further down the release tube 530, traverse structured light from another light source/structured light generator/detector arrangement. Such an arrangement may allow the computing device to compare a number of insects detected by one arrangement and by the other arrangement to provide more accurate insect counts. For example, if two insects (or a clump of several insects) traverse one sheet of structured light substantially simultaneously, but separate from each other prior to traversing the second sheet of structured light, the computing device may be able to distinguish the individual insects, rather than an apparently larger insect.

Figure 6:
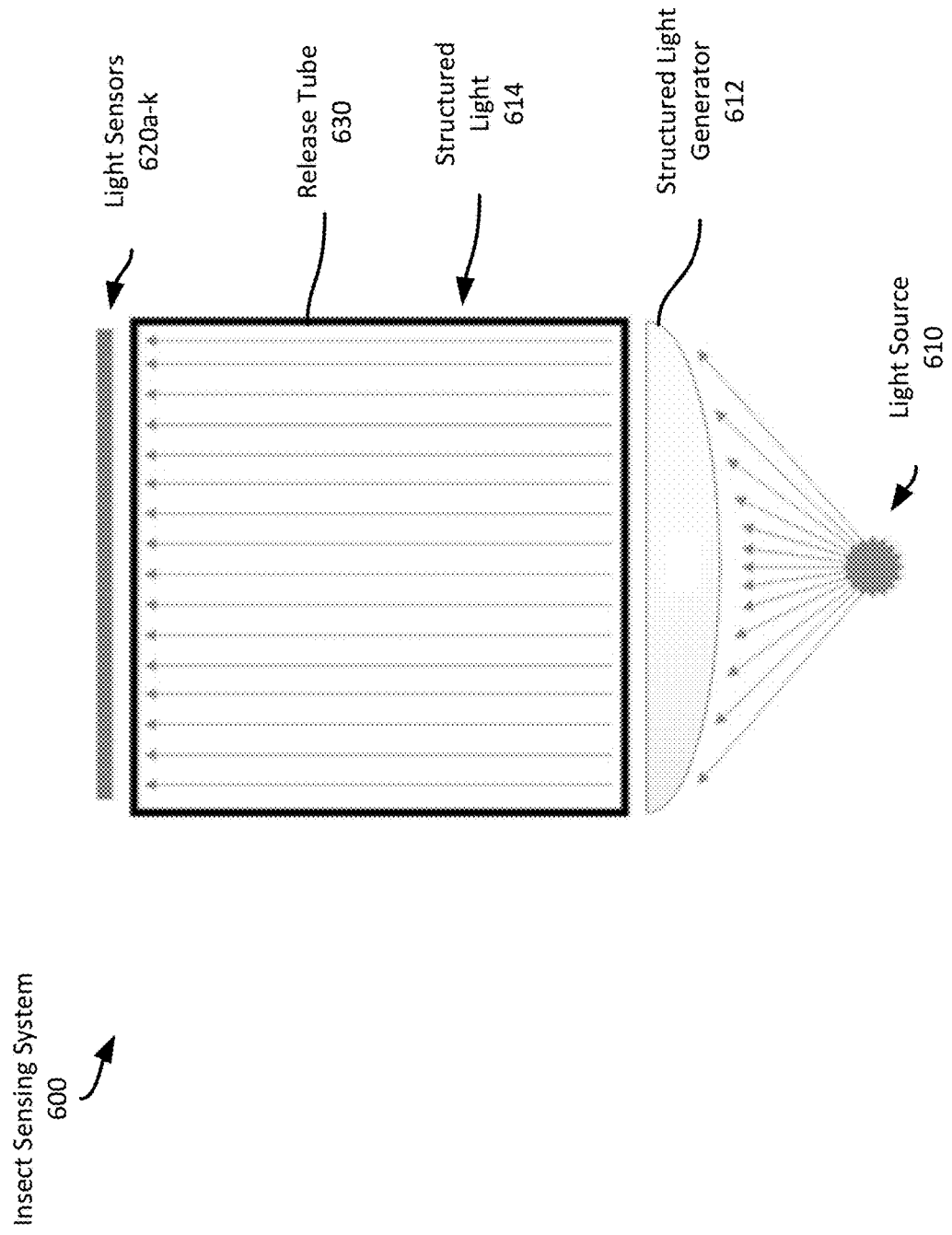

Referring now to FIG. 6, FIG. 6 shows an example insect sensing system 600 that employs a lens as a structured light generator 612. As with the example shown in FIG. 4, this example insect sensing system 600 only projects structured light 614 in one direction across the volume of the release tube 600. The light source 610 in this example is an LED with a diffusion filter. The structured light 614 is then detected by the light sensors 620a-k, which provide sensor signals to a computing device (not shown) to detect one or more insects traversing the release tube 630.

Figure 7:
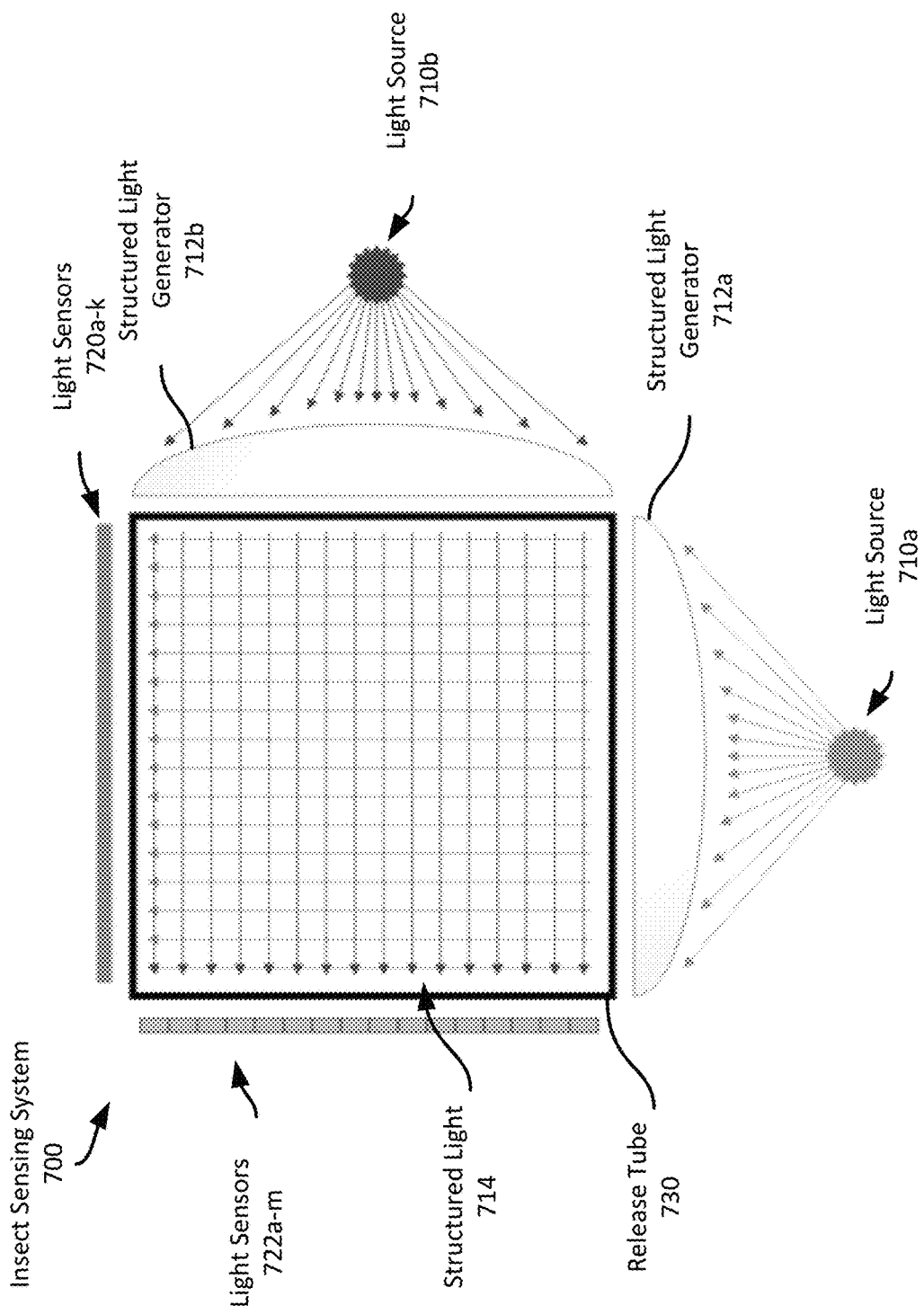

FIG. 7 shows an example insect sensing system 700 similar to the example system 500 shown in FIG. 5. The example system 700 includes two light sources 710a-b with corresponding lenses configured as structured light generators 712a-b and oriented to project light across the interior volume of the release tube 730 orthogonal to each other. The light sensors 720a-k, 722a-m detect the structured light 714 from their respective light source 710*a-b* and provide sensor signals to a computing device (not shown) indicative of the amount of light detected by the respective light sensor.

While in this example the two structured light generators 712*a-b* are both lenses, in some examples, multiple different types of structured light generators 712*a-b* may be employed in the same insect sensing system.

Figure 8:
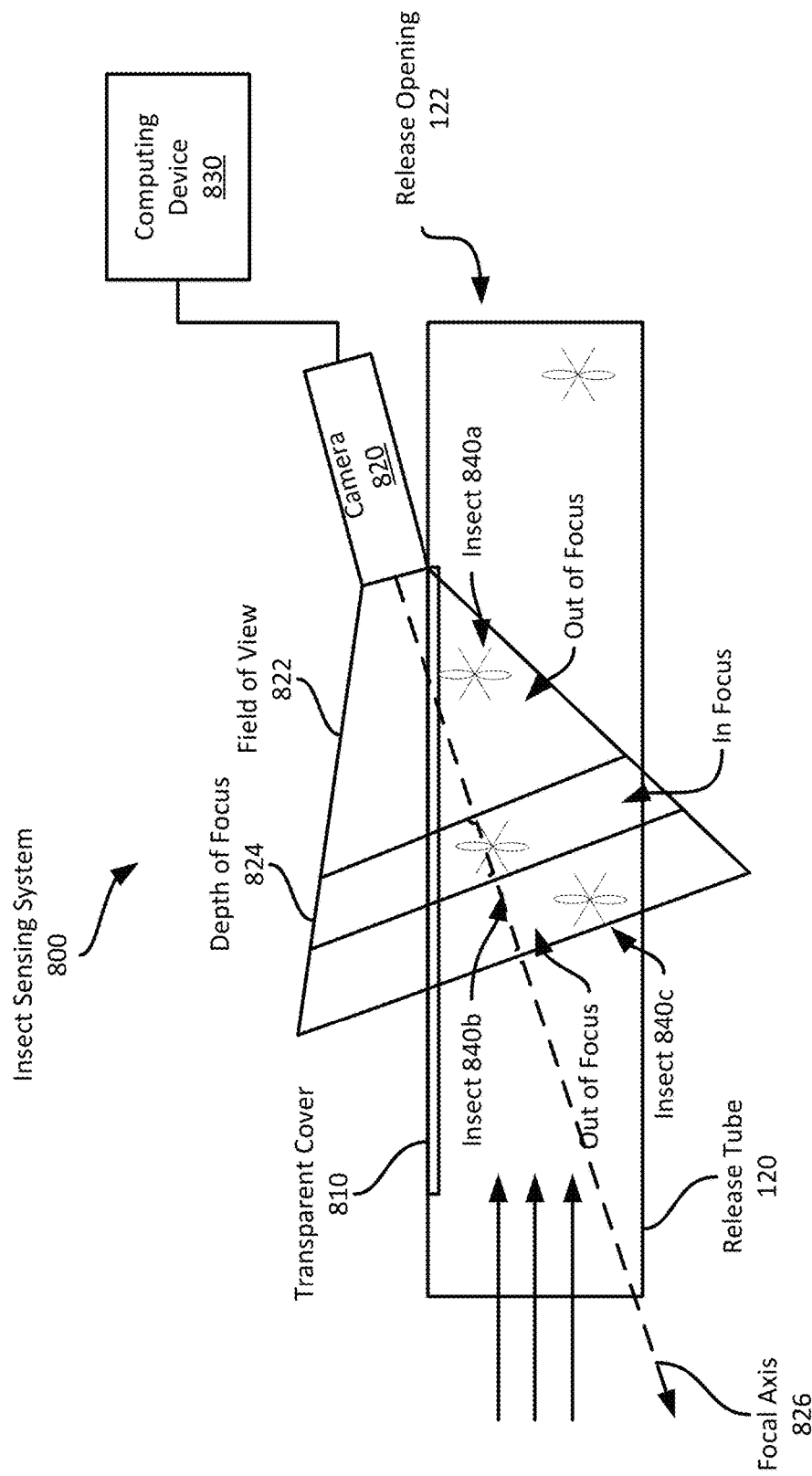

Referring now to FIG. 8, FIG. 8 shows an example insect sensing system 800. In this example, the system 800 includes a camera 820 positioned to capture an image of the interior volume of a release tube 120 through a transparent cover 810. As can be seen in FIG. 8, the camera 820 is oriented along a focal axis 826 oblique to the longitudinal axis of the release tube 120, but in the same plane as the release tube's longitudinal axis. The system 800 captures successive images of the interior volume of the release tube 120 within the field of view 822 and counts the number of insects within the images to determine the number of insects that have traversed the release tube 120.

To allow the insect sensing system 800 to accurately count the insects, in this example, the camera 820 has a lens aperture of f/2.8, but in some examples has a lens aperture of f/2.0 or wider. In addition, the camera 820 is configured to have a focal length of approximately 1.5 to 2 meters; however, any suitable focal length may be selected based on the position and orientation of the camera 820 with respect to the release tube 120. In this example, the camera 820 captures images at a resolution of 1280×720 pixels, but in some examples, lower or higher resolution images may be employed.

The camera is configured to have a shallow depth of focus 824 to allow it to capture images of insects 840*a-c* within the release tube 120, but only to capture insects in focus within a shallow volume within the release tube 120. The camera 820 may then capture successive images of the release tube's interior volume, and the captured images may then be analyzed by the computing device 830 to identify and count in-focus insects, while ignoring out-of-focus insects. Such a configuration may allow the sensing system 830 to identify insects as they move through the release tube 120 towards the release opening 122. However, because the camera 820 has a shallow depth of focus, each insect traversing the release tube 120 will only be in focus for a short period of time. Thus, as the camera 820 captures successive images, any individual insect may only be in focus for one or two frames. Thus, the system 800 can accurately count the number of insects traversing the release tube 120 over time.

Figure 9:
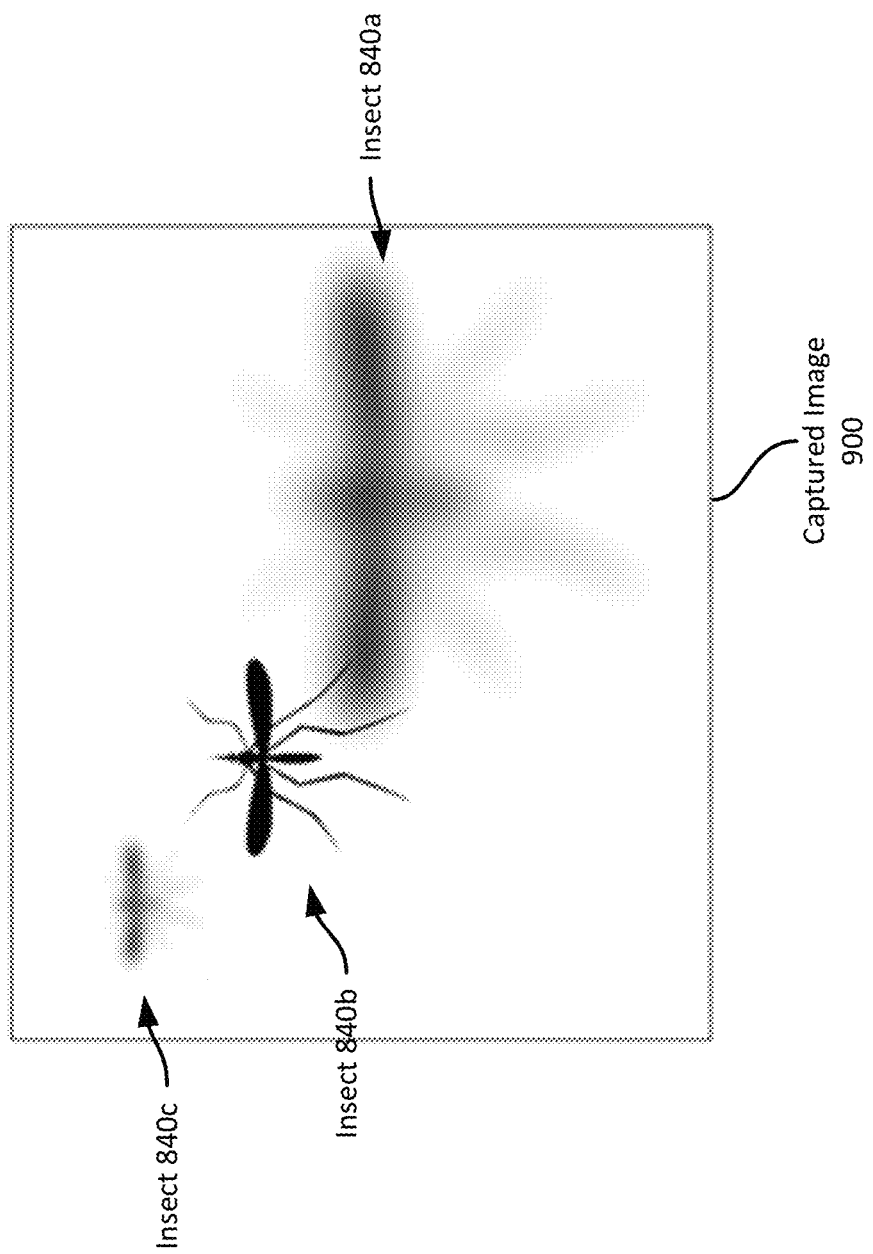
FIG. 9 shows a simulated image captured by an example insect sensing system.

For example, as insects 840*a-c* fly through the release tube 120 toward the release opening 122, insect 840*b* enters the depth-of-focus volume where the camera 820 captures an image with the insect 840*b* in focus, while insects 840*a* and 840*c* will appear out of focus. Referring to FIG. 9, FIG. 9 shows a simulated example captured image 900 of insects 840*a-c*. As can be seen, insects 840*a* and 840*c* appear out of focus, while insect 840*b* is in focus. The computing device 830 may identify the in-focus insect 840*b* using, for example, an edge detection technique. The edge detection technique can be configured to detect edges that are relatively sharp, indicating an in-focus object, and ignore softer or blurred edges associated with an out-of-focus object.

In one example, the computing device 830 performs edge detection for each pixel in each image using a pixel window centered on the respective pixel. This process generates an edge gradient map for the image, which can then be analyzed to identify edge gradients above a reference threshold. If an edge gradient is sufficiently high for a threshold number of adjacent pixels, the computing device 830 may determine an object, e.g., an insect, has been identified, and increment a counter. In some examples, rather than edge detection techniques, the computing system 830 may employ contour recognition techniques or object recognition techniques, such as a machine learning technique, to recognize insects within captured images. In one example, a machine learning technique can be trained to recognize in-focus insects and to ignore out-of-focus insects, and when one or more in-focus insects are recognized within an image, the computing device 830 increments a counter based on the number of recognized in-focus insects.

To capture sufficient images of insects as they traverse the release tube 120 to provide an accurate insect count, the camera 820 captures images at a rate of approximately 60 hertz ("Hz") in this example. To help ensure that an insect is in-focus for at least one image, a lens may be selected that provides a depth of field of the average length of the subject insects, e.g., 8-10 mm for a mosquito, and, based on an expected flight speed, a frame rate may be selected where at least one image of every insect traversing the release tube 120 is statistically probable. For example, if a depth of field of 20 mm is desired, e.g., twice the average length of a mosquito, and an expected maximum flight speed of 2 meters per second ("m/s") is employed, a frame rate of approximately 100 Hz is should capture at least one in-focus image of every insect traversing the release tube. If a slightly larger depth-of-field 824 is employed, e.g., 30 mm, a lower frame rate may be employed, e.g., 66.67 Hz, which may reduce the computational burden on the computing device 830 as fewer images are captured, and more time elapses between each new image. However, a higher frame rate, such as 240 Hz, may allow a shallow depth of focus, e.g., 20-30 mm, and accommodate a faster insect movement speed. It should be appreciated, however, that any suitable frame rate may be employed according to different examples.

In some examples, the camera 820 may capture multiple images of the same insect, e.g., the insect is moving slowly, the frame rate is selected to capture multiple in-focus images of insects within a depth of field, etc. The computing device 830, in some examples, may attempt to ensure that an insect is not double (or triple, etc.) counted. In one example, the computing device 830 employs an optical flow technique to identify movement of an insect through successive captured images. Using such a technique, the computing device 830 may identify an insect in two or more successive images as being the same insect, thereby only incrementing a counter by one rather than once for each image in which the insect was detected. Such a technique may help ensure a more accurate count of insects traversing the release tube 120.

Figure 10:
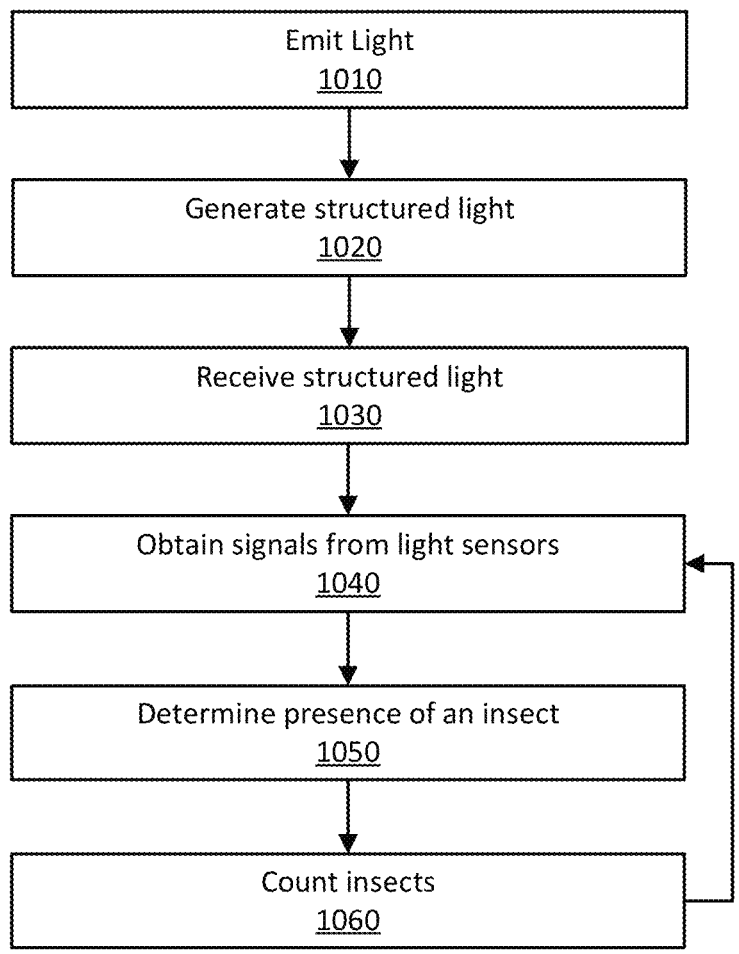
FIGS. 10-12 show example insect sensing methods.

Referring now to FIG. 10, FIG. 10 shows an example insect sensing method 1000. The method 1000 will be described with respect to the insect sensing system 300 shown in FIG. 3, however, it should be appreciated that any suitable sensing system according to this disclosure may be employed, including any of the systems 400-700 shown in FIGS. 4-7.

At block 1010, the sensing system 300 emits light using the light source 310. In this example, the light source 310 is a laser light source, but in some examples, it may be any suitable light source, including an LED, incandescent light source, a fluorescent light source, etc.

At block 1020, the sensing system 300 generates structured light from the emitted light using a structured light generator. In this example, the sensing system 300 also employs a Fresnel lens or a convex lens to collimate the structured light; however, any suitable structured light generator may be employed, with or without a light collimator.

At block 1030, the sensing system 300 receives at least some of the structured light using multiple light sensors 320a-k. In this example, the light sensors 320a-k are one or more of a photodiode, a phototransistor, or a photoresistor; however, any suitable light sensor may be employed, including a CCD or CMOS image sensor.

At block 1040, the computing device 330 obtains one or more sensor signals from each of the light sensors 320a-k. In this example, each sensor signal indicates an amount of light received by the respective light sensor; however, in some examples each sensor signal may indicate an average amount of light received by the respective light sensor over a period of time. In this example, the sensor signal is a voltage proportional to the amount of light received by the respective sensor; however, in some examples, the signal may be a current or a digital value (e.g., a pixel value) indicating an amount of light received. In some examples, a sensor signal may be a binary value, e.g., 0 or 1, indicating whether a threshold amount of light was received by the respective light sensor. If the threshold amount of light was not received by a light sensor, e.g., due to an insect blocking some of the structured light, the sensor may output a binary 0, while another light sensor that did receive at least the threshold amount of light, the light sensor may output a binary 1.

At block 1050, the sensing system 300 determines the presence of an insect based on a received sensor signal from at least one light sensor where the signal indicates a reduced amount of received light. In this example, the computing device 330 receives sensor signals from the light sensors 320a-k over time and, for each of the light sensors 320a-k, it determines an average amount of light received. Thus, if an insect obstructs (or partially obstructs) a portion of the structured light, one or more light sensors 320a-k may output a sensor signal indicating an amount of received light that is less than the average amount of received light for the respective light sensor.

Because, in some examples, each light sensor 320a-k may experience variations in the amount of light received due to ambient light, noise, dust particles, etc., in this example, the computing device 330 may compare the amount of received light to the average amount of received light for the respective light sensor. If the computing device 330 determines that the difference between the two amounts is greater than a threshold, the computing device 330 determines that an insect has been detected as it passes through the structured light 314. However, if the difference between the two amounts is less than the threshold, the computing device 330 determines that no insect is present. In some examples, if the difference between the two amounts is less than the threshold, the computing device 330 may update the average amount of received light for the respective light sensor based on the received sensor signal.

In this example, the computing device 330 employs a threshold of 50% of the average amount of received light. Thus, if a light sensor 320a-k outputs an average sensor signal of 5 Volts ("V"), the computing device 330 will detect the presence of an insect if the light sensor outputs a sensor signal of 2.5 V or less. It should be appreciated that this threshold is merely an example, and in some examples, other thresholds may be employed.

In some examples, however, rather than maintaining an average amount of received light for each light sensor 320a-k, the computing device 330 may maintain an average amount of light received by all sensors. Thus, received sensor signals from the light sensors 320a-k may each be compared to this average amount of light received by all sensors. Further, rather than using average sensor values, the computing device 330 may instead employ a fixed threshold sensor signal value, e.g., 3.5 V, below which an insect is detected and above which no insect is detected, irrespective of an average value.

While in the example described above, the computing device 330 compares each sample against a determined average sensor value, in some examples, such a comparison may be performed in circuitry outside of the computing device 330. For example, and as described above with respect to FIG. 3, a comparator may be employed to compare a received sensor value against a threshold value, such as an average sensor value. The output of the comparator may then be provided to the computing device 330, either directly or via one or more intermediate components, such as an amplifier, inverter, etc.

It should be appreciated that in some examples, an insect may obstruct light received by multiple light sensors 320a-k. For example, the light sensors 320a-k may be spaced 1 mm apart, while a mosquito traversing the release tube may have a width of 3-4 mm. Thus, the mosquito may obstruct structured light received at several light sensors. If the computing device 330 detects multiple adjacent light sensors 320a-k each received an amount of light indicative of an insect being present, the computing device 330 may determine that each of the sensor signals relates to the same insect, and thus, the computing device 330 may determine the presence of a single insect, despite multiple light sensors indicating a reduced amount of received light. For example, the computing device 330 may be provided with information regarding light sensor spacing, average or maximum dimensions of the type(s) of insects that will be traversing the release tube, or with a parameter indicating a maximum number of adjacent light sensors that may indicate a signal insect. Thus, in some examples, if three adjacent light sensors provide sensor signals indicating a reduced amount of received light, the computing device 330 may determine the presence of one insect. But if five adjacent light sensors provide sensor signals indicating a reduced amount of received light, the computing device 330 may determine the presence of two insects.

Further, as discussed above, such as with respect to FIG. 5, structured light 314 may be projected in multiple different directions across the interior volume of the release tube 120. In examples where the different sources of structured light 512a-b are co-planar, one or more light sensors from one set of light sensors 520a-k may indicate a reduced amount of received light. Similarly, light sensors from the second set of light sensors 522a-m may also indicate a reduced amount of received light. The computing device 330 may then determine, for each set of sensors 520a-k and 522a-m a number of detected insects. The computing device 330 may then determine a total number of detected insects based on these two different counts of insects. For example, a single insect traversing the release tube 120 may obstruct light landing on two light sensors from the first set of light sensors 520a-k and three light sensors from the second set of light sensors 522a-m. Thus, the computing device 330 determines that each set of light sensors 520a-k, 522a-m determined the presence of one insect. Because the structured light 314 is coplanar, the total number of detected insects is one.

Figure 11:
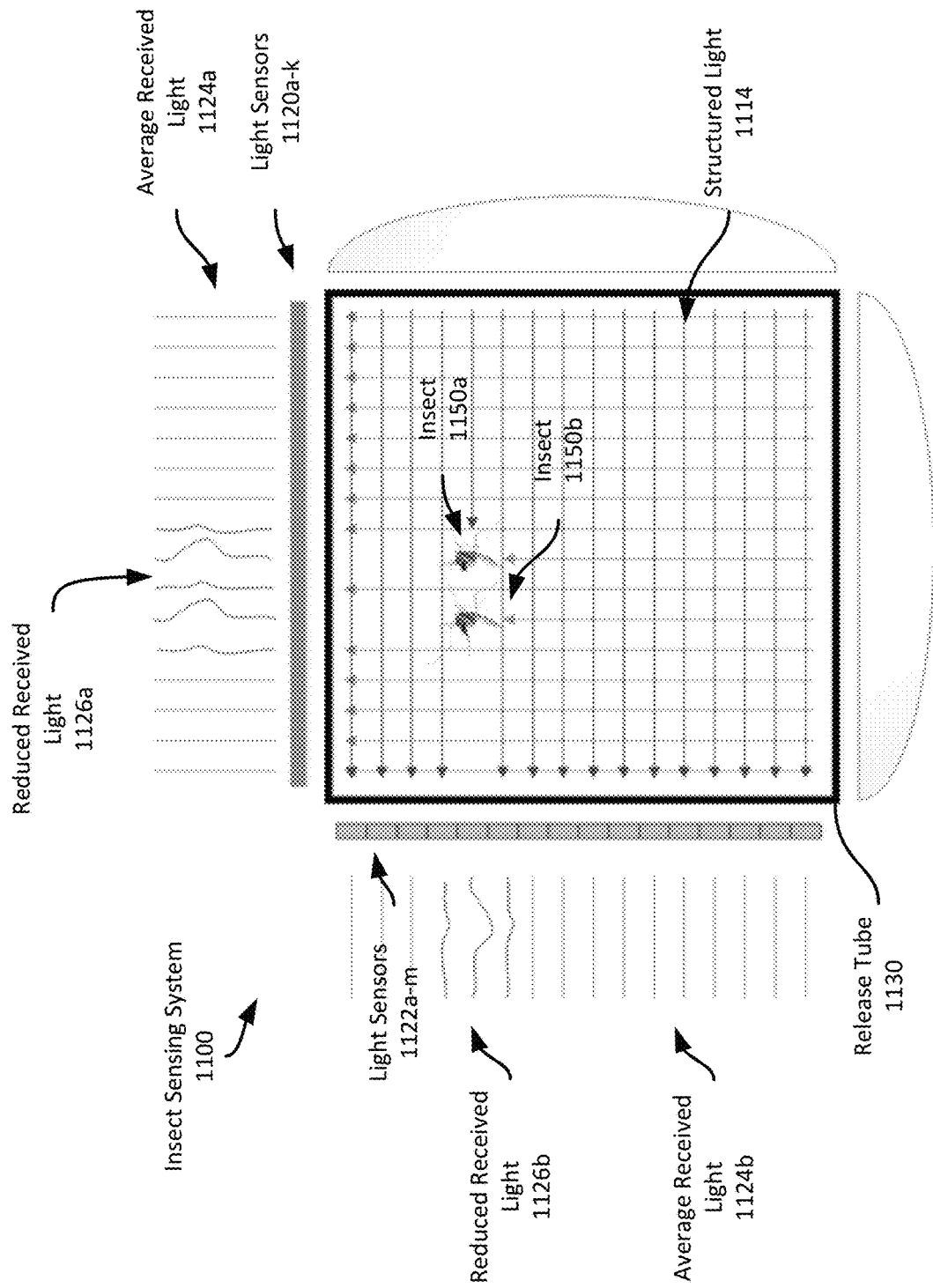

However, in some examples insects may traverse the release tube 120, and thus the structured light 314, in close proximity to each other. Referring to FIG. 11, two insects 1150a-b are traversing the structured light 1114 of an example insect sensing system 1100. As can be seen in FIG. 11, two sets of light sensors 1120a-k and 1122a-m receive structured light 1114 and, if nothing is obstructing the structured light received by a light sensor, it outputs substantially the average amount of received light 1124a-b, which may differ for the two sets of light sensors 1120a-k, 1122a-m. However, the insects 1150a-b are obstructing light received by five light sensors in the first set of light sensors 1120a-k and three light sensors in the second set of light sensors 1122a-m. Thus, in this example, the computing device 330 determines that the first set of light sensors 1120a-k indicates the presence of two insects, while the second set of light sensors 1122a-m indicates the presence of one insect. Thus, to determine the number of insects present, the computing device 330 selects the larger of the two values and thus determines that two insects are present.

In some examples, the computing device 330 may receive sensor signals at a high rate such that multiple successive sensor signals indicate the same insect. Thus, in some examples, the computing device 330 may determine that if a light sensor outputs sensor signals indicating a reduced amount of light for several successive samples, the computing device 330 may determine that the successive samples relate to the same insect and not determine the presence of a new insect. The number of successive samples for which a single insect is detected may be established based on an expected flight speed of an insect and a sample rate of the sensor signals. Thus, as the sample rate increases, the number of successive samples where a single insect may be expected to obstruct structured light may increase. However, as the expected flight speed increases, the number of successive samples where a single insect may be expected to obstruct structured light may decrease. Thus, the combination of the two factors can provide an expected, or maximum, number of successive samples that may relate to the same insect.

At block 1060, the computing device 330 counts the detected insects. In this example, the computing device 330 maintains a counter value and, for each insect detected at block 1050, it increments the counter value.

After completing block 1060, the method 1000 returns to block 1040 where additional sensor signals are received from the light sensors 520a-k, 522a-m.

The foregoing examples have described insect sensing systems and methods that employ structured light. Other examples of insect sensing systems and methods may employ different techniques. The following examples relate to insect sensing systems and methods that capture images of the interior volume of a release tube to sense insects as they traverse the release tube.

Figure 12:
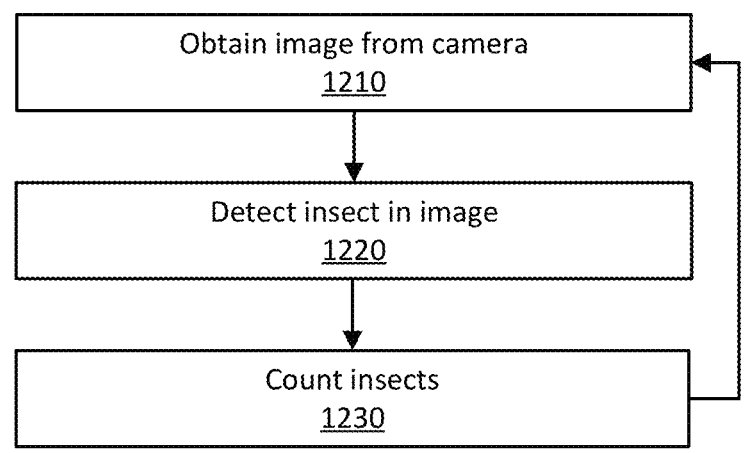

Referring now to FIG. 12, FIG. 12 shows an example insect sensing method 1200. The method 1200 will be described with respect to the insect sensing system 800 shown in FIG. 8, however, it should be appreciated that any suitable sensing system according to this disclosure may be employed.

At block 1210, the image sensing system 800 obtains an image from the camera 820. In this example, the camera 820 has an image sensor and a lens having an aperture of f/2.8, though in some examples, a camera may have a wider lens aperture. In addition, the camera 820 is positioned and oriented generally as described above with respect to FIG. 8, and is configured to capture images of the interior volume of the release tube 120. In this example, the computing device 830 obtains captured images from the camera 820 at a predetermined rate, such as between 60 Hz and 240 Hz. In some examples, a predetermined rate may be selected such that the image sensing system 800 will likely capture multiple in-focus images of the same insect. Such a predetermined rate may be determined based on the depth of focus and the average flight speed of the insects of the insect population to be released. For example, if the depth of focus is 30 mm and the average insect flight speed is 5 meters per second, a predetermined sample rate of at 333 Hz would be sufficient to ensure at least two images of an insect while it is in focus. In this case, sample rate=0.5*focal length (mm)/flight speed (mm/s) to ensure at least two images are captured. For a larger number of images, n, the sample rate may be computed as $$\frac{n * \text{flight speed} \left(\frac{\text{mm}}{\text{s}}\right)}{\text{focal length (mm)}}$$

However, sample rates may be determined according to any suitable formula.

At block 1220, the computing device 330 detects one or more insects in the image. In this example, the computing device 830 detects one or more insects in the image using an edge detection technique. Specifically, the computing device 830 searches the image for sufficiently well-defined edges to identify one or more insects. To do so in this example, the computing device 830 performs edge detection for each pixel in each image using a pixel window centered on the respective pixel. This process generates an edge gradient map for the image, which can then be analyzed to identify edge gradients above a reference threshold. If an edge gradient is sufficiently high for a threshold number of adjacent pixels, the computing device 830 may determine an insect has been identified. And while this example generates an edge gradient map, in other examples other suitable edge detection techniques may be employed.

In some examples, other techniques may be employed to detect one or more insects, such as trained machine learning techniques, object detection techniques, contour recognition techniques, etc. Images obtained by the computing device 830 may be provided to one or more such techniques to identify one or more insects within the images.

At block 1230, the computing device 830 counts the insects detected in the obtained image and increments a total insect count. In this example, the computing device increments a total insect count by the number of insects detected in each image. However, in some examples, the computing device 830 may determine that one or more insects appear in multiple images and not increment the total insect count. For example, the computing device 830 may perform one or more optical flow techniques on two or more successive images to determine whether any insects detected in one image were also detected in other images. For example, an image that appears in a first image at one position may also appear in a second image in a different location; however, based on the position, orientation, etc. of the insect in one image, an optical flow technique may determine that an insect in another image is the same insect. Thus, the computing device 830 may only increment a total image count once per insect, even if the detected insect appears in multiple images.

The method 1200 may then return to block 1210 where another image is obtained from the camera 820.

Figure 13:
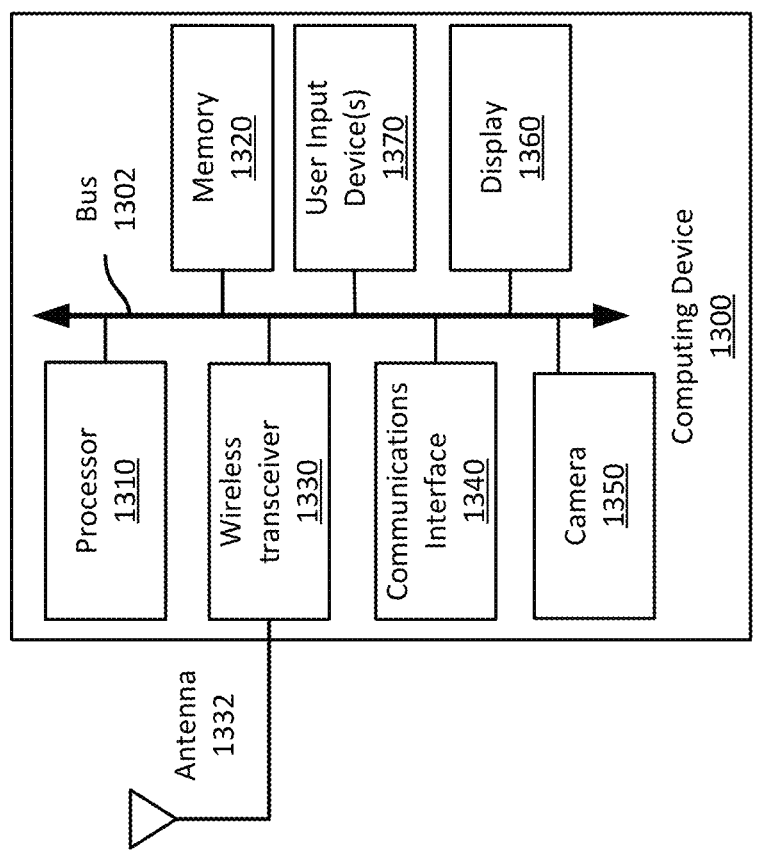
FIG. 13 shows an example computing device for insect sensing systems and methods.

Referring now to FIG. 13, FIG. 13 shows an example computing device 1300 suitable for use with one or more insect sensing systems and methods according to this disclosure. The example computing device 1300 includes a processor 1310 which is in communication with the memory 1320 and other components of the computing device 1300 using one or more communications buses 1302. The processor 1310 is configured to execute processor-executable instructions stored in the memory 1320 to perform insect sensing according to different examples, such as part or all of the example methods 1000, 1200 described above with respect to FIGS. 10 and 12. The computing device, in this example, also includes one or more user input devices 1370, such as a keyboard, mouse, touchscreen, microphone, etc., to accept user input. The computing device 1300 also includes a 1360 display to provide visual output to a user.

The computing device also 1300 includes a wireless transceiver 1330 and corresponding antenna 1332 to allow the computing device 1300 to communicate wirelessly using any suitable wireless communication protocol, including WiFi, Bluetooth ("BT"), cellular, etc. techniques. The computing device 1300 also includes a communications interface 1340 that enables communications with external devices, such as a camera (e.g., the camera 820 shown in FIG. 8), one or more light emitters (e.g., the light emitters shown in FIGS. 3-7), or one or more light sensors (e.g., the light sensors shown in FIGS. 3-7). In some examples, the communications interface 1340 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

In this example, the computing device 1300 also includes a camera 1350, which may be employed as a camera for insect sensing, such as described above with respect to FIG. 8. Thus, in some examples, the camera 820 and the computing device 830 of FIG. 8 may be incorporated into the same device, while in other examples, they may be discrete devices that communicate, e.g., using the communications interface 1340.

While some examples of methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A sensing system comprising:
    an insect pathway to enable movement of insects from a first location to a second location;
    an insect detector positioned to detect insects traversing the insect pathway, the insect detector comprising:
    a camera oriented and focused to capture images across the insect pathway; and
    a processor in communication with a non-transitory computer-readable medium and configured to execute processor-executable code stored in the non-transitory computer-readable medium to:
        obtain an image from the camera;
        identify at least one in-focus insect traversing the insect pathway in the image; and
        ignore any out-of-focus insect in the image.

2. The sensing system of claim 1, wherein the processor is configured to execute processor-executable code stored in the non-transitory computer-readable medium to detect the in-focus insect in the image using an edge detection technique.

3. The sensing system of claim 2, wherein the processor is configured to execute processor-executable code stored in the non-transitory computer-readable medium to:
generate an edge gradient map of the image, and
detect the at least one in-focus insect in the image using the edge gradient map.

4. The sensing system of claim 3, wherein the processor configured to execute processor-executable code stored in the non-transitory computer-readable medium to:
for each pixel in the image, determine an edge using pixels within a pixel window centered on the respective pixel, and
generate the edge gradient map using the determined edges.

5. The sensing system of claim 1, wherein the processor is configured to execute processor-executable code stored in the non-transitory computer-readable medium to detect the insect in the image using a machine learning technique.

6. The sensing system of claim 1, wherein the processor is configured to execute processor-executable code stored in the non-transitory computer-readable medium to:
identify the in-focus insect in multiple consecutive images; and
increment an insect count by one for the identified in-focus insect in one image of the multiple consecutive images, and
not increment the insect count for the identified in-focus insect in the other images of the multiple consecutive images.

7. A method comprising:
obtaining an image from a camera of a sensing system, the sensing system comprising an insect pathway to enable movement of insects from a first location to a second location and an insect detector positioned to detect insects traversing the insect pathway, the insect detector comprising the camera, the camera oriented and focused to capture images across the insect pathway;
identifying at least one in-focus insect traversing the insect pathway in the image; and
ignoring any out-of-focus insect in the image.

8. The method of claim 7, further comprising detecting the in-focus insect in the image using an edge detection technique.

9. The method of claim 8, further comprising:
generating an edge gradient map of the image, and
detecting the at least one in-focus insect in the image using the edge gradient map.

10. The method of claim 9, further comprising:
for each pixel in the image, determining an edge using pixels within a pixel window centered on the respective pixel, and
generating the edge gradient map using the determined edges.

11. The method of claim 7, further comprising detecting the in-focus insect in the image using a machine learning technique.

12. The method of claim 7, further comprising:
identifying the in-focus insect in multiple consecutive images; and
incrementing an insect count by one for the identified in-focus insect in one image of the multiple consecutive images, and
not incrementing the insect count for the identified in-focus insect in the other images of the multiple consecutive images.

13. A non-transitory computer-readable medium comprising processor-executable instructions configured to cause a processor to:
obtain an image from a camera of a sensing system, the sensing system comprising an insect pathway to enable movement of insects from a first location to a second location and an insect detector positioned to detect insects traversing the insect pathway, the insect detector comprising the camera, the camera oriented and focused to capture images across the insect pathway;
identify at least one in-focus insect traversing the insect pathway in the image; and
ignore any out-of-focus insect in the image.

14. The non-transitory computer-readable medium of claim 13, further comprising processor-executable instructions configured to cause a processor to detect the in-focus insect in the image using an edge detection technique.

15. The non-transitory computer-readable medium of claim 14, further comprising processor-executable instructions configured to cause a processor to:
generate an edge gradient map of the image, and
detect the at least one in-focus insect in the image using the edge gradient map.

16. The non-transitory computer-readable medium of claim 15, further comprising further comprising processor-executable instructions configured to cause a processor to:
for each pixel in the image, determine an edge using pixels within a pixel window centered on the respective pixel, and
generate the edge gradient map using the determined edges.

17. The non-transitory computer-readable medium of claim 13, further comprising further comprising processor-executable instructions configured to cause a processor to detect the in-focus insect in the image using a machine learning technique.

18. The non-transitory computer-readable medium of claim 13, further comprising further comprising processor-executable instructions configured to cause a processor to:
identify the in-focus insect in multiple consecutive images; and
increment an insect count by one for the identified in-focus insect in one image of the multiple consecutive images, and
not increment the insect count for the identified in-focus insect in the other images of the multiple consecutive images.

* * * * *